INVENTORS
JOSEPH F. LOPRETE
SIDNEY ELKIND

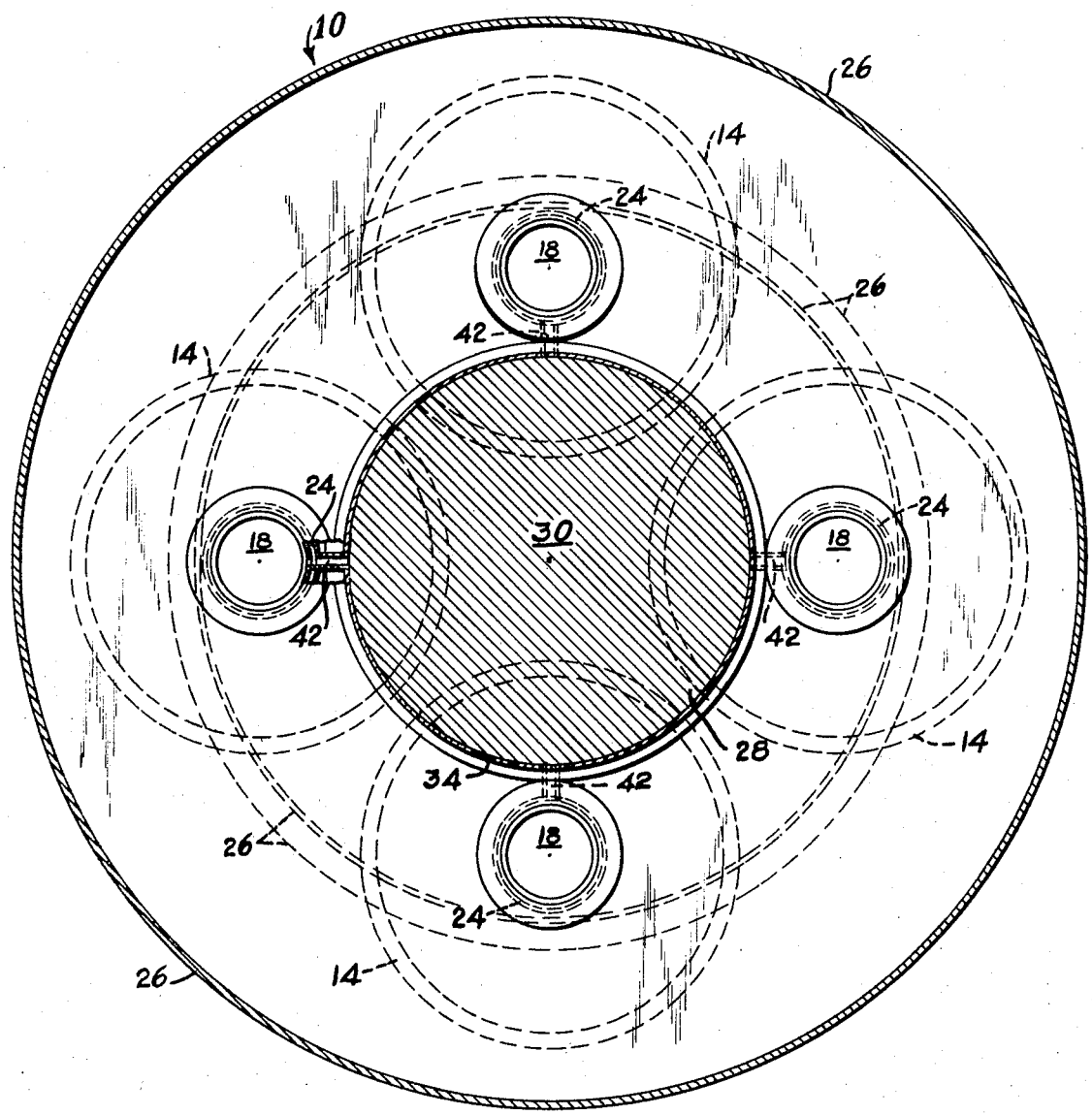

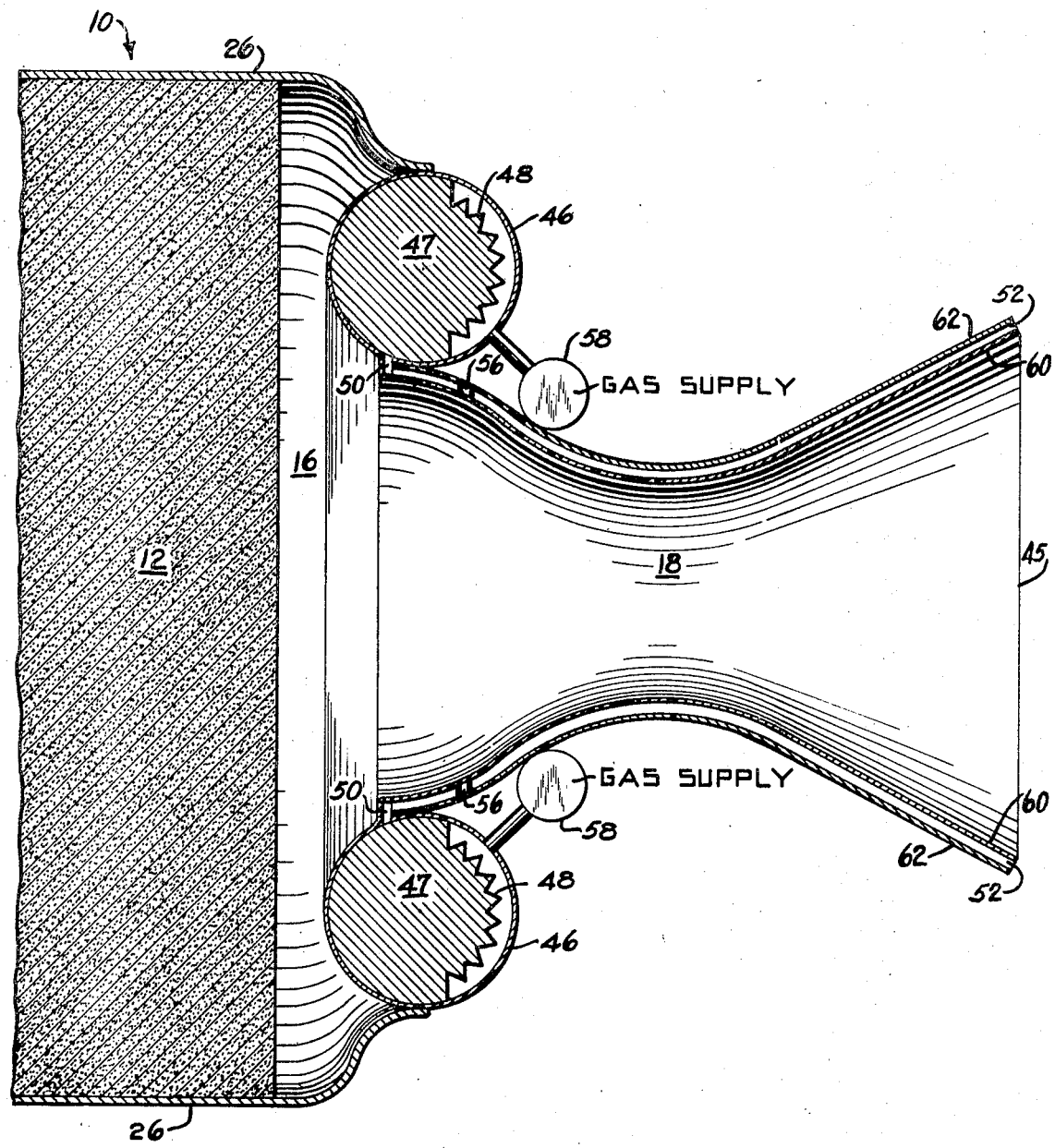

United States Patent Office 3,520,139
Patented July 14, 1970

1

3,520,139
NOZZLE COOLANT SUPPLY SYSTEM
Sidney Elkind, Bronx, N.Y., and Joseph F. Loprete, Wayne, N.J., assignors to Curtiss-Wright Corporation
Filed June 11, 1964, Ser. No. 374,369
Int. Cl. F02k *11/00*
U.S. Cl. 60—267                     12 Claims This invention relates to means for cooling the nozzles of rockets and other types of jet engines and is more particularly directed to a novel means for supplying means for cooling the walls of the exhaust nozzle.

Since in liquid fuel rockets and jet engines a liquid is present which may be used for cooling the walls of the exhaust nozzle, the cooling problem for the exhaust nozzle wall is not as great a problem as that in the case of solid fuel rockets. In solid fuel rockets, the fuel is not readily adaptable for use as a cooling medium for the nozzle walls and therefore separate means must be provided for cooling said walls. Means for carrying out such a function have been already proposed, as for example that shown in co-pending application Ser. No. 133,904 filed Aug. 25, 1961 now Pat. No. 3,151,449 by Simon V. Manson and entitled "Rocket Nozzle Cooling System," which application is assigned to the same assignee as the present application.

The present invention is directed to a novel and improved means for supplying a liquid metal coolant to the inner walls of the exhaust nozzle of a rocket or jet engine. In present day solid fuel rockets, the combusion temperature becomes so high that there is danger of destroying the walls of the exhaust nozzles and more effective means for cooling these walls must be provided. The present invention provides such a means by providing a metallic coolant, which is normally a solid at room temperatures, with said metallic coolant being stored in a container or reservoir inside the motor case for the rocket engine and supported on the aft closure thereof. The solid coolant receives heat from the combusion of the solid fuel in the combustion chamber and is melted at the axially inner portion or upstream portion of the storage means. A diaphragm means is provided which is pressurized by combustion gas pressure from the combustion chamber which pushes against the downstream portion of the metallic coolant which in turn forces the melted or liquid portion of the coolant in the upstream portion out of the storage means into a passage means and into the nozzle portion for cooling the hot walls. As the liquid coolant passes through the nozzle means, the intense heat therein causes the liquid coolant to boil before discharge therefrom into the flow path of the exhaust gases from the rocket motor and then into the outer environment.

The invention has advantages over prior systems in that the metallic coolant is kept completely out of contact with the combustion gases and, since only a portion of the storage means is exposed to the hot temperatures of the combustion gases, boiling of the coolant within the storage means itself is substantially avoided. Further, using pressure from the combustion chamber to force the coolant into the nozzle wall passages has the advantage of being independent of acceleration loadings which occur during the flight of the vehicle and may effect other mechanisms such as pumps or the like.

Accordingly, it is one object of the invention to provide a novel and improved means for cooling the walls of the rocket or jet engine exhaust nozzle.

It is a further object of the invention to provide a reliable means for supplying coolant to the walls of the exhaust nozzle which means is dependent upon the combustion pressure from the combustion chamber.

It is an additional object of the invention to provide

2 a liquid coolant means for the walls of the exhaust nozzle for a jet or rocket engine wherein the coolant is stored within the interior of the engine and means are provided for forcing the coolant into passage means within the exhaust nozzle walls and also includes means which substantially prevents boiling of the coolant while in the storage means.

It is still a further object of the invention to provide a novel and improved cooling means for the walls of the exhaust nozzle for a rocket or jet engine wherein means are provided for converting a solid coolant into a liquid and including means for supplying the liquid coolant to the walls of said exhaust nozzle in response to combustion pressures from the engine.

Other objects and advantages of the invention will become apparent upon reading the following detailed description with the accompanying drawings in which:

FIG. 2 is a sectional view taken along line 2—2 of FIG. 1; and

FIG. 3 is a partial axially sectional view through an exhaust portion of the rocket engine showing another embodiment of the invention.

Figure 1:
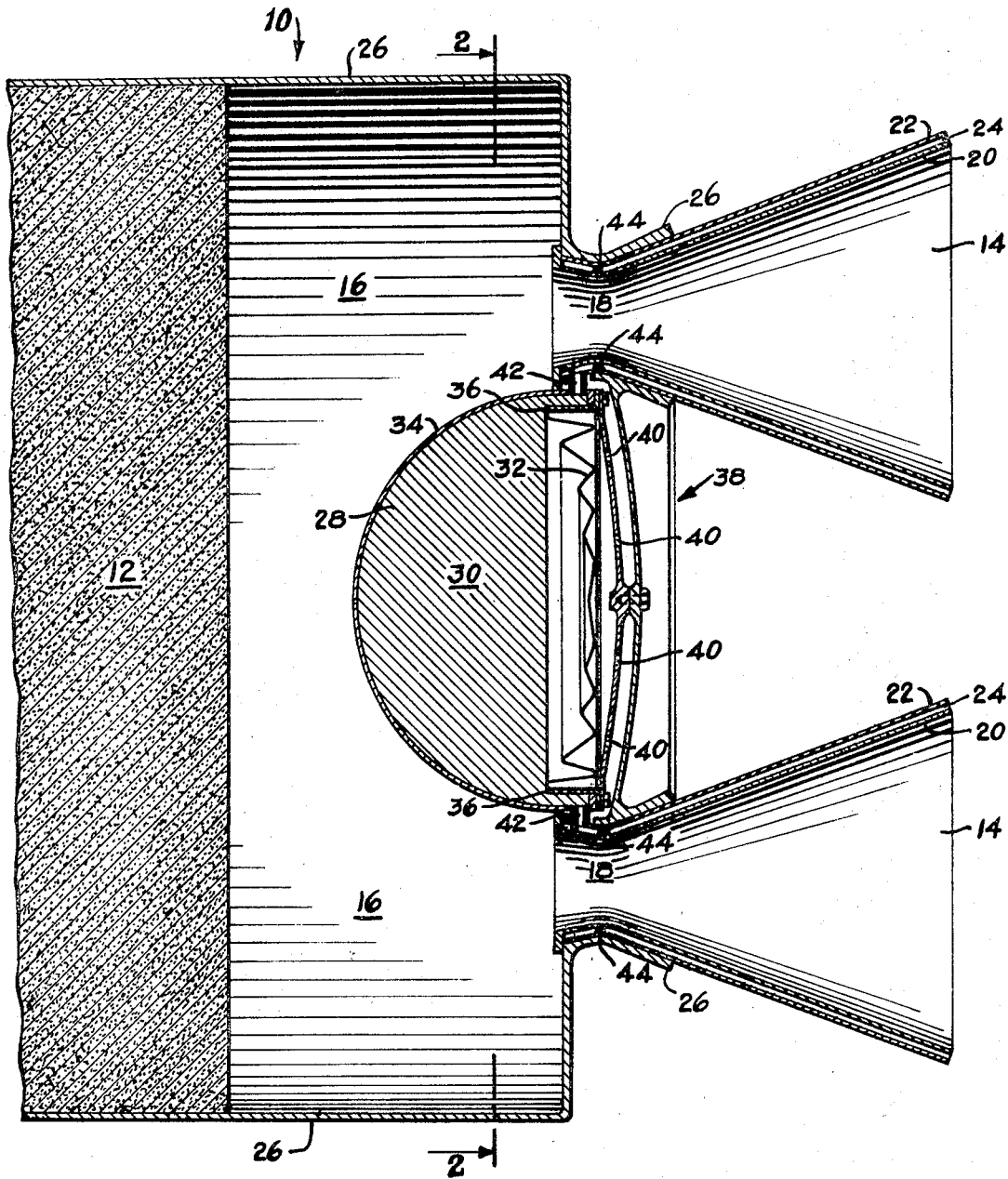
FIG. 1 is a partial axial sectional view of the exhaust end of the solid fuel rocket embodying the invention.

In FIGS. 1 and 2 there is shown a solid fuel rocket engine 10 loaded with a solid fuel 12 and having a plurality of exhaust nozzles 14, there being four illustrated, which nozzles 14 are circumferentially spaced about the rear end of the rocket combustion chamber 16.

Each of the nozzles 14 has a convergent-divergent profile wherein there is defined a throat portion 18. The nozzles are further provided with spaced walls including an inner wall 20 and an outer wall 22 to define a passage 24 therebetween. It will be apparent that the passage 24 is substantially annular around the entire periphery of the nozzle 14.

Supported within the rocket casing 26, at the aft end thereof is a reservoir 28 which defines an essentially hemispherical or elliptical container. The container or reservoir 28 is suitably fastened to the aft end of the rocket case 26 and is filled with a metallic coolant 30 such as lithium or the like. Various other metallic coolants of suitable boiling points may be used such as sodium, potassium and mixtures thereof although lithium is preferred because of its high thermal capacity. Supported at the aft end or downstream end of the reservoir 28 is an expandable metallic diaphragm and it will be apparent from FIG. 1 that the metallic coolant is stored between the outer reservoir wall and the metallic diaphragm 32. The aft end of the reservoir 28 is provided with a double wall construction including the wall 34 of the reservoir and a wall 36 which supports the metallic diaphragm member 32. As will be apparent from the explanation hereinafter this construction has particular significance in providing reliable flow of the coolant to the exhaust nozzle portions.

The aft closure section 38 of the rocket engine 10 or the dome section 38 is provided with a plurality of openings 40 which openings provide communication between the combustion chamber 16 and the bottom or aft side of the metallic diaphragm 32. Through this means pressure from the combustion chamber 16 is permitted to flow through the openings 40 in the aft closure section and act against the bottom side of the metallic diaphragm 32 relative to the metallic coolant for exerting an axial pressure on said diaphragm 32 and on the metallic coolant in the reservoir 28. Passage means 42 are provided between the reservoir 28 and the passages 24 in the exhaust nozzles 14 so that liquid coolant may be forced through said passages 42 and into the passages 24 of the exhaust nozzle. Annular flow restriction means 44 are provided within the passage means 24 in the exhaust nozzles 14 to insure uniform flow of the coolant into said passages 24 around the entire annular entrance to said passages. In addition, the restrictions 44 serve to regulate the coolant flow therethrough. As illustrated in FIG. 1, the restrictions 44 are positioned downstream in the passages 24 from the passages 42 so as not to obstruct the flow of coolant from the reservoir 28 into the passages 24.

As stated above, the metallic coolant 30 is normally in a solid state at room temperatures. However, when the solid fuel 12 is ignited by a suitable ignition means (not shown), the burning of the fuel will generate heat which will heat the upstream portion of the reservoir 28 as the combustion gases flow thereover and melt the metallic coolant along the upstream portion or inner surface of the wall 34 of said reservoir 28. At the same time, pressure from the burning of the fuel in the combustion chamber 16 will flow through the openings 40 in the aft closure section 38 and exert a pressure against the metallic diaphragm 32. This pressure will cause the diaphragm 32 to push against the metallic coolant 30 at the aft end of the reservoir 28 which metallic coolant is not directly in the path of the heat from the combustion in the combustion chamber and is presumed to be in a solid state in this portion of the reservoir 28. The pressure of the metallic diaphragm 32 will push the metallic coolant at the downstream end of the reservoir 28 axially toward the upstream end of said reservoir 28 and force that portion of the coolant which has been converted to a liquid to flow along the inner surface of the wall 34 of the reservoir 28 and out into the passage 42 where it will flow into the passages 24 of the exhaust nozzles 14. As the liquid metallic coolant flows through the passages 24 heat will be absorbed from the inner wall 20 of the exhaust nozzles 14 and as the liquid metallic coolant reaches the discharge end of the exhaust nozzle 14 it will be sufficiently heated to boil whereupon it will be discharged into the outer environment along with the exhaust gases from said nozzle 14. The double wall structure of the reservoir 28 comprising the walls 34 and 36 prevents the diaphragm 32 from expanding in a direction towards the side portion of the wall 34 or toward the passages 42 so as not to block the flow of the liquid coolant into the passages 42.

It is also within the scope of the invention to provide a supply of solid metallic coolant of the same type used in the reservoir 28 within the passages 24 so that as soon as exhaust gases begin to pass through the exhaust nozzles 14 immediate cooling will be provided by the metallic coolant in said passages 24. It will be apparent that, as long as combustion takes place in the combustion chamber 16, pressure will be provided against the diaphragm 32 to continually force the metallic coolant at the downstream end of the reservoir 28 toward the upstream end of said reservoir 28 wherein the metallic coolant will be heated and converted to a liquid form and be forced out into the passages 24 of the exhaust nozzle 14 for cooling the walls thereof. It will further be apparent that the metallic coolant in the reservoir 28 does not come into contact at any time with the combustion gases and therefore the metallic coolant 30 will not be contaminated by formation of chemical compounds that might block the coolant passages 42 and 24. It should also be noted that the reservoir and its structure is completely supported within the interior of the rocket 10 so as not to provide any external bulky structure which might hinder storage or operation of the rocket engine 10. During operation of the rocket 10, the heated metallic coolant 30 adjacent the upstream end of the reservoir wall 34 will be constantly replaced by cooler metallic coolant from the interior or downstream end of the reservoir 28 so that it will be apparent that the chance of boiling of the coolant or over-heating of the reservoir wall is avoided.

In FIG. 3 there is shown another embodiment of the invention which in principle is the same as that illustrated in FIG. 1. Instead of providing a hemispherical or elliptical reservoir as in the embodiment of FIG. 1, the embodiment of FIG. 3 is provided with a toroidal-shaped reservoir 46 which surrounds the upstream end of the exhaust nozzle 45. Although only one exhaust nozzle 45 is illustrated in FIG. 3 with one toroidal-shaped reservoir 46, it will be apparent that any number of nozzles and reservoirs 46 may be provided. The reservoir 46 contains a metallic coolant 47 in the same manner as the embodiment of FIG. 1 and is provided at its downstream end with a metallic diaphragm 48. Passage means 50, leading from the reservoir 46, are provided which passage means 50 are in communication with the passage means 52 of the exhaust nozzle 45. Restriction means 56 may also be provided for insuring an annular distribution of the coolant within the passages 52. As illustrated in FIG. 3, it should be understood that since the reservoir 46 entirely surrounds the nozzle 45 there will be a substantially uniform distribution of the coolant in the passages 52 of said nozzle 45 and therefore the restriction means 56 may be eliminated, if desired. A gas supply means 58, which may comprise a gas bottle with suitable valving structure, may be provided for pressurizing the diaphragm 48 so that the coolant will be forced out into the passage 50 and the passage 52 similar to the operation of FIG. 1. It should also be understood that pressurizing means of the type described with respect to the embodiment of FIG. 1 is preferably provided in the embodiment of FIG. 3 and in which case the gas supply bottle 58 may therefore be eliminated.

The toroidal-shaped reservoir 46 of the embodiment of FIG. 3 has the advantage that only a relatively small portion of said reservoir lies within the combustion chamber 16 of the rocket engine 10 so that more space may be occupied by solid fuel 12. This type of reservoir while offering such an advantage does not involve the disadvantage of occupying a substantial space on the exterior portion of the rocket engine 10 in that only a small portion thereof extends toward the exterior or downstream portion thereof. In operation, the upstream portion of the metallic coolant 47 in the reservoir 46 is exposed to the heat from the combustion gases and will melt while the pressure from the gas bottle 58 or from the combustion chamber 16 will pressurize the diaphragm 48 to push the metallic coolant 47 at the downstream portion of the reservoir 46, which is exposed to cooler temperatures being away from heat combustion gas flow path, in an upstream direction for forcing the liquid metallic coolant into the passage 50 and thence into the passage 52 for cooling the inner wall 60 of the nozzle 45. As in the case of the embodiment of FIG. 1, the exhaust nozzle 45 is provided with a double wall structure comprising spaced walls 60 and 62 which form the passage 52 therebetween.

It will be apparent from the above description that a novel and improved cooling means for a rocket engine nozzle is provided which means provides a substantially constant flow of liquid coolant for the inner walls of said nozzle substantially as long as the rocket engine is in operation. The invention has one advantage in that no separate heating means is required for heating the solid metallic coolant for converting it to liquid form and that no bulky structures are required on the outside of a rocket casing 26. Through the structure of the invention the metallic coolant cannot be contaminated by the combustion gases in that, said metallic coolant never comes into contact with the combustion gases and since only a portion of the reservoir containing the metallic coolant is exposed to the heat from the combustion chamber gases there is little chance that the coolant will boil in the reservoir or that the reservoir walls will be overheated.

It will also be apparent that, since the reservoirs in both embodiments of the invention are located in such close proximity to the burning solid fuel, production of coolant for the exhaust nozzle walls will be promptly supplied in that, as is well known, the most intense heating in the rocket engine occurs at the beginning of the firing period and this is the time when prompt flow of coolant is desired. As the solid fuel burns away, the heating will be reduced but coolant will still be supplied to the nozzle wall as the metallic coolant at the downstream end of the reservoir is pushed towards the hotter portion of the reservoirs 30 and 46 for supplying coolant but the contents of the reservoirs 30 and 46 will not be excessively heated so that the entire contents thereof will not be melted at once. This is due to the fact that, as the solid fuel burns, the distance between the reservoirs 30 or 46 and the combustion in the combustion chamber is increased and sufficient heat is present to melt the metallic coolant along the inner wall surface of the upstream portion reservoirs 30 or 46 but the heat is insufficient to melt the entire contents thereof. It will also be apparent that the system is entirely independent of acceleration loadings imposed on the vehicle when in flight or in launching since the system may be completely operated from the pressure in the combustion chamber and that no pumps or separate pressurizing means need be used.

While we have described our invention in detail in its present preferred embodiment, it will be obvious to those skilled in the art, after understanding the invention, that various modifications may be made therein without departing from the spirit and scope thereof. We aim in the appended claims to cover all such modifications.

We claim:

1. A cooling structure for a jet engine having an exhaust nozzle and a combustion chamber providing for flow of exhaust gases for discharge through said exhaust nozzle, said cooling structure comprising a reservoir containing a metallic coolant which is a solid at room temperatures, said reservoir being disposed downstream of said combustion chamber and having a first portion with an outer wall thereof exposed to the flow of exhaust gases from said combustion chamber to said exhaust nozzle such that, during flow of said exhaust gases, said metallic coolant in said first portion of said reservoir is heated and converted from a solid to a liquid; passage means operatively connecting said first portion of said reservoir with said exhaust nozzle for discharge of liquid metallic coolant through said exhaust nozzle; diaphragm means in a second portion of said reservoir with said second portion of said reservoir being relatively remote from the flow of combustion gases from said combustion chamber to said exhaust nozzle so that the metallic coolant in said second portion is relatively cool, said diaphragm means being disposed relative to said first portion of said reservoir so that in response to pressure exerted on one side of said diaphragm means said relatively cool metallic coolant in said second portion of said reservoir is urged by said diaphragm in a direction toward said first portion of said reservoir; and means for exerting pressure against said one side of said diaphragm means for forcing said relatively cool metallic coolant from said second portion of said reservoir toward said first portion of said reservoir during engine operation such that the liquid metallic coolant in said first portion of said reservoir is displaced by said relatively cool metallic coolant and forced from said first portion of said reservoir into said passage means.

2. A cooling structure as recited in claim 1 wherein said reservoir is supported at the rear end portion of said jet engine adjacent to said exhaust nozzle and at least said first portion being disposed within said combustion chamber.

3. A cooling structure as recited in claim 2 wherein said reservoir has a substantially hemispherical profile.

4. A cooling structure as recited in claim 2 wherein said reservoir comprises a sealed container so that the metallic coolant within said reservoir is free from contamination by the exhaust gases from said combustion chamber.

5. A cooling structure as recited in claim 1 wherein said passage means includes a first set of passages disposed at the downstream end of said reservoir with said passages being operatively connected between the inner surface of the outer wall of said first portion and the inner surface wall of said exhaust nozzle.

6. A cooling structure as recited in claim 5 wherein said nozzle includes a pair of spaced walls defining a passage therebetween and said first set of passages being operably connected to said passage between said spaced walls.

7. A cooling structure as recited in claim 1 wherein said diaphragm means includes an expandable metallic diaphragm member supported at the downstream end of said reservoir.

8. A cooling structure as recited in claim 1 wherein said reservoir includes a substantially annular axially-extending wall in the interior of said reservoir with said axially-extending wall being spaced from the outer wall of said reservoir to provide an annular passage therebetween and said diaphragm means being supported on the radially inward side of said axially-extending wall so that, during expansion of said diaphragm means toward said first portion, said axially extending wall prevents said diaphragm from blocking said annular passage.

9. A cooling structure as recited in claim 1 wherein said means for exerting pressure against said one side of said diaphragm means includes at least one passage communicating with said combustion chamber and the downstream side of said diaphragm means such that pressure from said combustion chamber is exerted against the downstream side of said diaphragm means for urging said diaphragm means to expand in an upstream direction.

10. A cooling structure as recited in claim 1 wherein said reservoir has a toroidal-shaped configuration.

11. A cooling structure as recited in claim 10 wherein said toroidal-shaped reservoir is disposed so as to surround a portion of said exhaust nozzle at the upstream end thereof.

12. A cooling structure for a jet engine having an exhaust nozzle and a combustion chamber providing for flow of exhaust gases for discharge through said exhaust nozzle, said cooling structure comprising a reservoir containing a metallic coolant which is solid at room temperatures, said reservoir having a first wall exposed to the flow of exhaust gases from said combustion chamber such that said metallic coolant adjacent said first wall is heated and converted from a solid to a liquid and said reservoir also having a second wall disposed relatively remote from the flow of exhaust gases from said combustion chamber such that said metallic coolant adjacent said second wall is relatively cool and said second wall comprising diaphragm means responsive to pressure exerted on one side thereof for forcing said relatively cool metallic coolant adjacent said second wall toward said first wall; passage means operatively connecting the heated liquid metallic coolant adjacent said first wall with said exhaust nozzle for flow through said exhaust nozzle such that as said diaphragm means forces said relatively cool metallic coolant toward said first wall the heated liquid metallic coolant adjacent said first wall is forced through said passage means and into said exhaust nozzle.

References Cited

UNITED STATES PATENTS

| | | | |
|---|---|---|---|
| 3,133,413 | 5/1964 | Lawrence | 60—35.6 |
| 3,137,132 | 6/1964 | Turkat | 60—35.6 |
| 3,167,909 | 2/1965 | Thielman | 60—35.6 |

SAMUEL FEINBERG, Primary Examiner

U.S. Cl. X.R.

60—39.48, 253, 263; 239—127.3